May 21, 1957 K. KALTENBACH 2,792,630
ANGLE-PIECE HEAD, MORE ESPECIALLY FOR GRINDING, FOR
DENTAL AND MEDICAL PURPOSES
Filed June 23, 1953
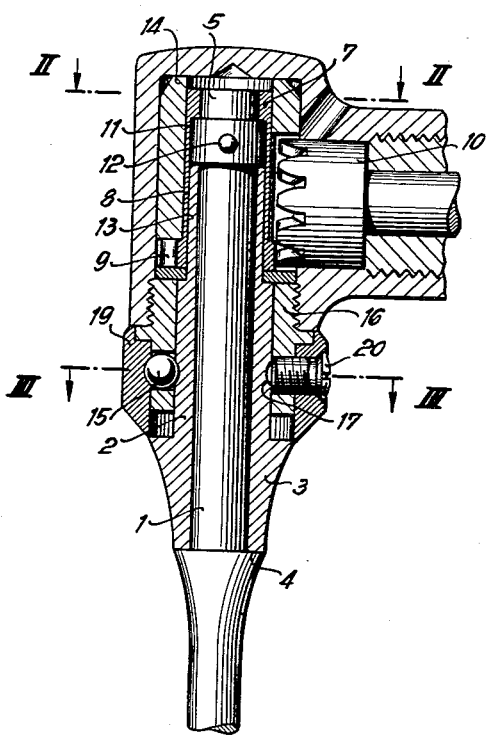
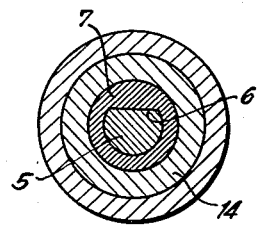
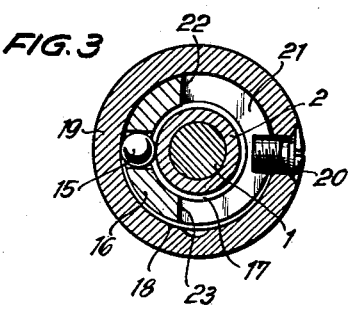
INVENTOR
K. Kaltenbach
ATTYS.

United States Patent Office 2,792,630
Patented May 21, 1957

2,792,630

ANGLE-PIECE HEAD, MORE ESPECIALLY FOR GRINDING FOR DENTAL AND MEDICAL PURPOSES

Kurt Kaltenbach, Biberach-Riss, Germany

Application June 23, 1953, Serial No. 363,453

Claims priority, application Germany July 16, 1952

6 Claims. (Cl. 32—27)

The invention relates to an angle-piece, perhaps with a shank elbow, which is particularly suitable for carrying out grinding work in connection with dental and medical purposes, but which can also be employed for drilling, polishing and burring.

More especially for executing grinding work, it is important to have a steady shock-free running of the instrument, since any shock on the instrument impairs accurate work and substantially increases the pain felt by the patient.

In order to achieve the desired object, it is proposed to arrange in the angle-piece head for mounting of the shank of the instrument, a bearing bush which project forwardly from the said head and which is adapted to be fitted jointly with the instrument shank through the front opening in the head into the latter and to be locked in position on said head.

The rear end of the instrument shank, which is provided with a "flat," engages in a correspondingly shaped recess of the upper drive, which is mounted with its external surface inside a further bearing bush fitted into the rear portion of the head.

The long bearing bush for the instrument shank can also project into the recess of the upper drive, the said part expediently being given a small wall thickness by turning its external surface in order in this manner to avoid increasing the dimensions of the angle-piece head.

Due to the long bearing bush for the instrument shank proposed in accordance with the invention, which on the one hand is extended beyond the forward end of the angle-piece head and on the other hand is extended at the rear end by its engagement into the bore of the upper drive, a reliable mounting of the instrument shank and thus an accurate running of the said instrument is achieved without appreciable increase in size of the usual angle-piece head. This is of considerable importance, more especially for executing grinding work with diamond tools.

The long bearing bush for the shank of the instrument is guided between collars of the said shank, the collar provided near the rear end of the said shank being detachable. The instrument shank thus forms a unit with the bearing bush.

The locking of the long bearing bush inside the angle-piece head is expediently effected by means of a ball which is arranged in the opening of a bush screwed into the front end of the head, the said ball being guided towards the axis of the instrument shank in an annular groove of the bearing bush and in the opposite direction in an eccentric track of a ring rotatably mounted on the bush screwed on to the front end of the head. The rotatability of the ring may be limited by a stop pin which engages in a recess of the ring and which is fitted into the bushing screwed into the angle-piece head.

An angle-piece head constructed in accordance with the invention is shown by way of example in the drawing, wherein:

Figure 1 shows the angle-piece head in longitudinal section,

Figure 2 shows the angle-piece head in a section on the line II—II of Figure 1, and Figure 3 shows the angle-piece head in a section on the line III—III of Figure 1.

In the drawings, 1 is the instrument shank, for example, for a grinding tool, 2 is a bearing bush which projects considerably from the front opening of the angle-piece head, the part 3 of the bearing bush being supported at its forward end on a shoulder 4 of the shank 1. The rear end 5 of the instrument shank is provided in the known manner with a "flat" 6 and engages in the correspondingly shaped rear end 7 of the tubular shaft 8 of the upper drive element 9. In this manner, with the rotation of the upper drive element 9, the shank 1 is driven by the central drive element 10.

Located before the rear end 5 of the instrument shank 1 is a collar ring 11 which is secured by means of a grub screw 12 to the instrument shank 1. The bearing bush 2 for the instrument shank 1 engages by the rearwardly extended end 13 in the bore of the tubular shaft 8 of the upper drive element 9 and extends up to the collar ring 11. In this manner, a very long bearing is provided for mounting the instrument shank 1 and this mounting ensures a completely shock-proof running of the instrument. The instrument shank 1 and the bearing bush 2 form a unit which is adapted to be introduced into the angule-piece head through the front opening in the latter.

In order to avoid increasing the size of the outer drive 9 and thus also the angle-piece head, that rearward portion 13 of the bearing bush engaging in the tubular shaft 8 of the upper drive element 9 is given a smaller wall thickness by turning the external surface.

The tubular shaft 8 of the upper drive element 9 is mounted with its external surface inside the bearing bush 14 which is fitted into the rear end of the angle-piece head. This bearing bush 14 is formed on the side facing the central drive 10 with a milled-out portion in order to ensure the possibility of engagement between the upper drive element 9 and the central drive element 10.

The locking of the long bearing bush 2, which is fitted jointly with the instrument shank 1 into the angle-piece head, is effected by means of a ball 15 which is arranged in an aperture of a bushing 16 screwed into the front opening of the head. Towards the axis of the instrument shank 1, the ball 15 is guided in an annular groove 17 of the bearing bush 2. In the opposite direction, the ball 15 is supported in an eccentric track 18 of the ring 19 rotatably mounted on the bush 16. According to the rotational position of the ring 19 in relation to the bush 16, the ball 15 is guided by the eccentrically arranged track 18 of the ring 19 into the annular groove 17 of the bearing bush 2 and into the locking position, or it is possible for it to slide on the eccentric track of the ring 19 out of the annular groove 17, so that the bearing bush 2 can be withdrawn jointly with the instrument shank 1 from the angle-piece head.

The rotation of the ring 19 into the locking and unlocking positions is limited by a stop pin 20, which is screwed into the rotatable ring 19 and engages at its inner end in a slot 21 of the bush 16. In this manner, there are obtained abutments 22, 23 for the stop pin 20.

I claim:

1. In an angle-piece head, comprising two tubular portions extending transversely to each other, for cutting instruments, more particularly for dental and medical purposes, a first tubular portion having a front opening, a second tubular portion having a drive shaft with a drive element thereon rotatable therein, the combination of a driven element rotatable in said first tubular portion in the part thereof remote from said front opening positioned to cooperate with the drive element on said drive shaft, said driven element including a tubular shaft, a tool unit comprising a long guiding bearing insertable into said front opening to project outwardly from the angle-piece head when so inserted and having a portion of reduced diameter to extend within the said tubular shaft of said driven element, a tool shank rotatable in said guiding bearing, said tool shank having a flat thereon at its rear end and said driven element having a corresponding opening therein to receive said rear end of the tool arbor to form a driving connection therewith, and retaining means on said first tubular portion for securing the guiding bearing in position therein.

2. In an angle-piece head, comprising two tubular portions extending transversely to each other, for instruments for grinding, polishing, drilling and milling, more particularly for dental and medical purposes, one of said tubular portions having a front opening, and a drive shaft with a drive element thereon rotatable in the other tubular element, the combination of a drive element rotatable in said first mentioned tubular element, in the part thereof remote from said front opening to co-operate with the drive element on said drive shaft, with a tool unit comprising a long guiding bearing insertable into said front opening and adapted to project outwardly from the angle-piece head when inserted into said front opening, a tool arbor rotatable in said guiding bearing, said tool arbor having a flat thereon at its rear end and said second mentioned drive element having a corresponding opening therein to receive said rear end of the tool arbor and form a driving connection therewith, bearing means on the tool arbor co-operating with the ends of said guiding bearing and including a removable collar on the rear end of the tool arbor, and retaining means on the said tubular portion receiving the tool unit for securing the guiding bearing in position therein.

3. In an angle-piece head, comprising two tubular portions extending transversely to each other, for instruments for grinding, polishing, drilling and milling, more especially for dental and medical purposes, one of said tubular portions having a front opening, and a drive shaft with a drive element thereon rotatable in the other tubular element, the combination of a drive element rotatable in said first mentioned tubular element, in the part thereof remote from said front opening to co-operate with the drive element on said drive shaft, and a bush screwed into said front opening, with a tool unit comprising a long guiding bearing insertable into said front opening and bush and adapted to project outwardly from the angle-piece head when so inserted, said guiding bearing having an annular groove therein, a tool arbor rotatable in said guiding bearing, said tool arbor having a flat thereon at its rear end and said second mentioned drive element having a corresponding opening therein to receive said rear end of the tool arbor and form a driving connection therewith, and retaining means on said bush for securing the tool unit in position on the angle-piece head, said retaining means comprising a ball radially displaceable in said bush for co-operation with the groove in the guiding bearing, and a ring rotatable on said bush and having an eccentric track therein to force the ball into said groove on the ring being rotated from a position in which the radial distance between the said eccentric track and the bush is equal to the diameter of the ball.

4. A tool unit for use with an angle-piece head comprising a tool arbor having a tool at its forward end, a fixed front abutment on the tool arbor, a collar removably supported by the tool arbor adjacent the rearward end thereof, a bearing bush surrounding the tool arbor and extending from the collar to the fixed front abutment and a planar face on the tool arbor at the rearward end above the collar adapted to cooperate with a corresponding face on a tubular shaft of a drive member for the tool arbor.

5. A tool unit as defined in and claimed by claim 4 further characterized in that the said fixed front abutment is a flat shoulder on the tool arbor.

6. An angle-piece head as defined in and claimed by claim 3 further characterized in that a stop pin carried by the ring is engageable with the walls of slot formed in the bush to limit the rotational movement of the said ring.

References Cited in the file of this patent

UNITED STATES PATENTS

| | | |
|---|---|---|
| 941,612 | Browne | Nov. 30, 1909 |
| 1,701,172 | Brown | Feb. 5, 1929 |
| 2,010,210 | Witt | Aug. 6, 1935 |
| 2,315,016 | Shotton | Mar. 30, 1943 |
| 2,504,233 | Staunt | Apr. 18, 1950 |